United States Patent
Tan et al.

(10) Patent No.: US 11,422,699 B2
(45) Date of Patent: Aug. 23, 2022

(54) STORAGE DEVICE AND COMPONENT MANAGEMENT METHOD OF STORAGE DEVICE

(71) Applicant: Huawei Technologies Co., Ltd., Shenzhen (CN)

(72) Inventors: Chunyi Tan, Chengdu (CN); Buchan Li, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/884,611

(22) Filed: May 27, 2020

(65) Prior Publication Data

US 2020/0285395 A1    Sep. 10, 2020

Related U.S. Application Data

(63) Continuation of application No. PCT/CN2018/117608, filed on Nov. 27, 2018.

(30) Foreign Application Priority Data

Nov. 28, 2017  (CN) .......................... 201711218681.9

(51) Int. Cl.
*G06F 3/06* (2006.01)
*G06F 13/16* (2006.01)

(52) U.S. Cl.
CPC .......... *G06F 3/0605* (2013.01); *G06F 3/0629* (2013.01); *G06F 3/0688* (2013.01); *G06F 13/1668* (2013.01)

(58) Field of Classification Search
None
See application file for complete search history.

(56) References Cited

U.S. PATENT DOCUMENTS

2014/0223071 A1   8/2014  Bert et al.
2014/0317336 A1  10/2014  Fitch et al.
(Continued)

FOREIGN PATENT DOCUMENTS

CN    102055615 A    5/2011
CN    103970688 A    8/2014
(Continued)

OTHER PUBLICATIONS

Petersen, Chris, "Introducing Lightning: A flexible NVMe JBOF," Mar. 9, 2016, 6 pages, [retrieved on Jul. 16, 2021], Retrieved from the Internet:<URL: https://engineering.fb.com/2016/03/09/data-center-engineering/introducing-lightning-a-flexible-nvme-jbof/> (Year: 2016).*

(Continued)

*Primary Examiner* — Edward J Dudek, Jr.
*Assistant Examiner* — Ralph A Verderamo, III
(74) *Attorney, Agent, or Firm* — Conley Rose, P.C.

(57) ABSTRACT

A method for managing components of a storage device includes: detecting a subscription event indicated in a subscription instruction sent by a host; recording event information of the detected subscription event when the subscription event is detected, and providing a notification to the host, so that the host sends an event information acquisition instruction; and sending the event information to the host according to the event information acquisition instruction.

22 Claims, 6 Drawing Sheets

(56) References Cited

U.S. PATENT DOCUMENTS

| | | | |
|---|---|---|---|
| 2015/0319243 A1* | 11/2015 | Hussain | G06F 3/0665 |
| | | | 709/217 |
| 2016/0127492 A1 | 5/2016 | Malwankar et al. | |
| 2017/0123659 A1 | 5/2017 | Nam et al. | |
| 2017/0228330 A1 | 8/2017 | Huang et al. | |
| 2017/0269874 A1 | 9/2017 | Roh | |
| 2018/0074973 A1* | 3/2018 | Chan | G06F 11/00 |
| 2018/0239540 A1* | 8/2018 | Kachare | G06F 13/4282 |
| 2018/0246833 A1* | 8/2018 | Bai | G06F 11/203 |
| 2018/0270119 A1* | 9/2018 | Ballapuram | H04L 61/2015 |

FOREIGN PATENT DOCUMENTS

| | | | |
|---|---|---|---|
| CN | 106095329 A | 11/2016 | |
| CN | 107015929 A | 8/2017 | |
| CN | 107038137 A | 8/2017 | |
| CN | 107193762 A | 9/2017 | |

OTHER PUBLICATIONS

"NVM Express," XP055749076, Revision 1.2.1, Jun. 5, 2016, 109 pages.
"NVM Express over Fabrics, Revision 1.0," Jun. 5, 2016, 49 pages.
"NVM Express Revision 1.2.1," Jun. 5, 2016, 217 pages.

* cited by examiner

STORAGE DEVICE AND COMPONENT MANAGEMENT METHOD OF STORAGE DEVICE

CROSS-REFERENCE TO RELATED APPLICATIONS

This is a continuation of Int'l Patent App. No. PCT/CN2018/117608 filed on Nov. 27, 2018, which claims priority to Chinese Patent App. No. 201711218681.9 filed on Nov. 28, 2017, which are incorporated by reference.

TECHNICAL FIELD

This disclosure relates to the field of storage technologies, and in particular, to a storage device and a component management method and apparatus of a storage device.

BACKGROUND

A just a bunch of flash (JBOF) device is a high-performance and low-latency storage device and includes at least one solid-state drive (SSD). As a Non-Volatile Memory Express (NVMe) protocol is extended to an NVMe over Fabrics (NOF) protocol, an SSD installed on a remote JBOF may directly provide a data storage service to a host through a network.

The NOF protocol is acquired by extending the NVMe protocol, and therefore the NOF protocol includes all instructions defined in the NVMe protocol and also includes a subscription instruction provided by the NVMe protocol. The subscription instruction is an asynchronous notification mechanism, and the host may send the subscription instruction to each SSD in a JBOF. The subscription instruction is used to instruct a controller of the SSD to detect an event that occurs in the SSD, for example, writing data into a doorbell register is invalid and a fault occurs. When detecting, according to the instruction of the subscription instruction, that an event subscribed by using the subscription instruction occurs, the controller of the SSD notifies the host of the event that occurs, so that the host knows the event that occurs in the SSD and performs corresponding processing.

Nevertheless, an existing event can be detected only by the controller of the SSD. However, when an SSD is plugged or unplugged, the host is unable to communicate with the controller of the SSD, and therefore the host is unable to learn of a swapping event of the SSD by using the subscription instruction. In this case, hot swapping of the SSD cannot be implemented. In addition, for other components in the JBOF that are not provided with controllers, for example, a fan and a temperature sensor, the host is also unable to acknowledge, by using the subscription instruction, events that occur in these components, and consequently the host is unable to handle the events that occur in these components.

SUMMARY

Embodiments of this disclosure provide a storage device and a component management method of a storage device, to resolve a problem in a related technology that an interrupt event can be detected only by a controller of an SSD. The technical solutions are as follows:

According to a first aspect, a component management method of a storage device is provided and the method includes: detecting a subscription event indicated in a subscription instruction sent by a host; recording event information of the detected subscription event when the subscription event is detected, and providing a notification to the host, so that the host sends an event information acquisition instruction; and sending the event information to the host according to the event information acquisition instruction.

According to the method provided in this embodiment, the storage device may detect, according to the subscription instruction from the host, whether an event subscribed in the subscription instruction occurs in a component, notify the host in a network of the subscribed event that occurs, and transmit event information to the host, so that the host in the network learns of, in a timely manner, the event that occurs in the component in the storage device and the event information. Further, according to the method provided in this embodiment, it can be ensured that the host detects, in a timely manner, unplugging of an SSD and subscription events of components that are not provided with processors, for example, a fan and a temperature sensor.

In a possible design, the host communicates with the storage device by using an NVMe protocol or a protocol that is developed based on the NVMe protocol and that includes an instruction of the NVMe protocol; the storage device is a JBOF and includes a component management module; and when the host establishes a connection to the storage device, the storage device generates an identifier for the component management module, the host generates a communication queue for the component management module based on the identifier, and the storage device communicates with the host through the communication queue by running the component management module.

Based on this design, the component management module is disposed in the storage device, and the component management module serves as a virtual SSD to exchange information with the host, so as to ensure that a manner of managing a component of the storage device can be compatible with an existing NOF protocol or another protocol that is developed based on the NVMe protocol. Steps are simple and effective.

In a possible design, the component is an SSD in the storage device, and the subscription event is a swapping event of the SSD.

Based on this design, the host may learn of the swapping event of the SSD in a timely manner.

In a possible design, the recording event information of the detected subscription event when the subscription event is detected includes: detecting the swapping event of the SSD when it is detected that a level signal of a slot of the SSD changes; and using at least one of an event status of the swapping event, an identifier of the component, a timestamp of the swapping event, and an index number of the SSD as the event information, and recording the event information in an event log.

In a possible design, the method further includes: periodically detecting any event that occurs in the component included in the storage device, and recording event information; and when the subscription instruction sent by the host is received, acquiring, from the recorded event information, an event corresponding to the subscription instruction, and notifying the host of the event.

According to a second aspect, a component management apparatus of a storage device is provided, and the component management apparatus is applied to a storage device; the storage device includes a component management module and at least one component, and the storage device is connected to a host through a network; and the component management module includes: a detection submodule configured to detect a subscription event indicated in a subscription instruction sent by the host; a recording submodule configured to record event information of the detected subscription event when the subscription event is detected; a notification submodule configured to provide a notification to the host, so that the host sends an event information acquisition instruction; and a sending submodule configured to send the event information to the host according to the event information acquisition instruction from the host.

In a possible design, the host communicates with the storage device by using an NVMe protocol or a protocol that is developed based on the NVMe protocol and that includes an instruction of the NVMe protocol; the storage device is a JBOF and further includes a connection module, where the connection module is configured to: when the host establishes a connection to the storage device, generate an identifier for the component management module; the host generates a communication queue for the component management module based on the identifier; and the storage device communicates with the host through the communication queue by running the component management module.

In a possible design, the component is an SSD in the storage device, and the subscription event is a swapping event of the SSD.

In a possible design, the component management module is further configured to: detect the swapping event of the SSD when it is detected that a level signal of a slot of the SSD changes; and use at least one of an event status of the swapping event, an identifier of the component, a timestamp of the swapping event, and an index number of the SSD as the event information, and record the event information in an event log.

In a possible design, the detection submodule is further configured to periodically detect any event that occurs in the component included in the storage device; the recording submodule is further configured to record event information; and the notification submodule is further configured to: when the subscription instruction sent by the host is received, acquire, from the recorded event information, an event corresponding to the subscription instruction, and notify the host of the event.

According to a third aspect, a storage device is provided, where the storage device includes a processor and at least one component, and the storage device is connected to a host through a network; and the processor is configured to load at least one instruction to implement operations performed in the component management method of a storage device.

According to a fourth aspect, a computer readable storage medium is provided, where the storage medium stores at least one instruction, and the instruction is loaded and executed by a processor to implement operations performed in the component management method of a storage device.

DESCRIPTION OF EMBODIMENTS

To make objectives, technical solutions, and advantages of this disclosure clearer, the following further describes implementations of this disclosure in detail with reference to accompanying drawings.

Figure 1:
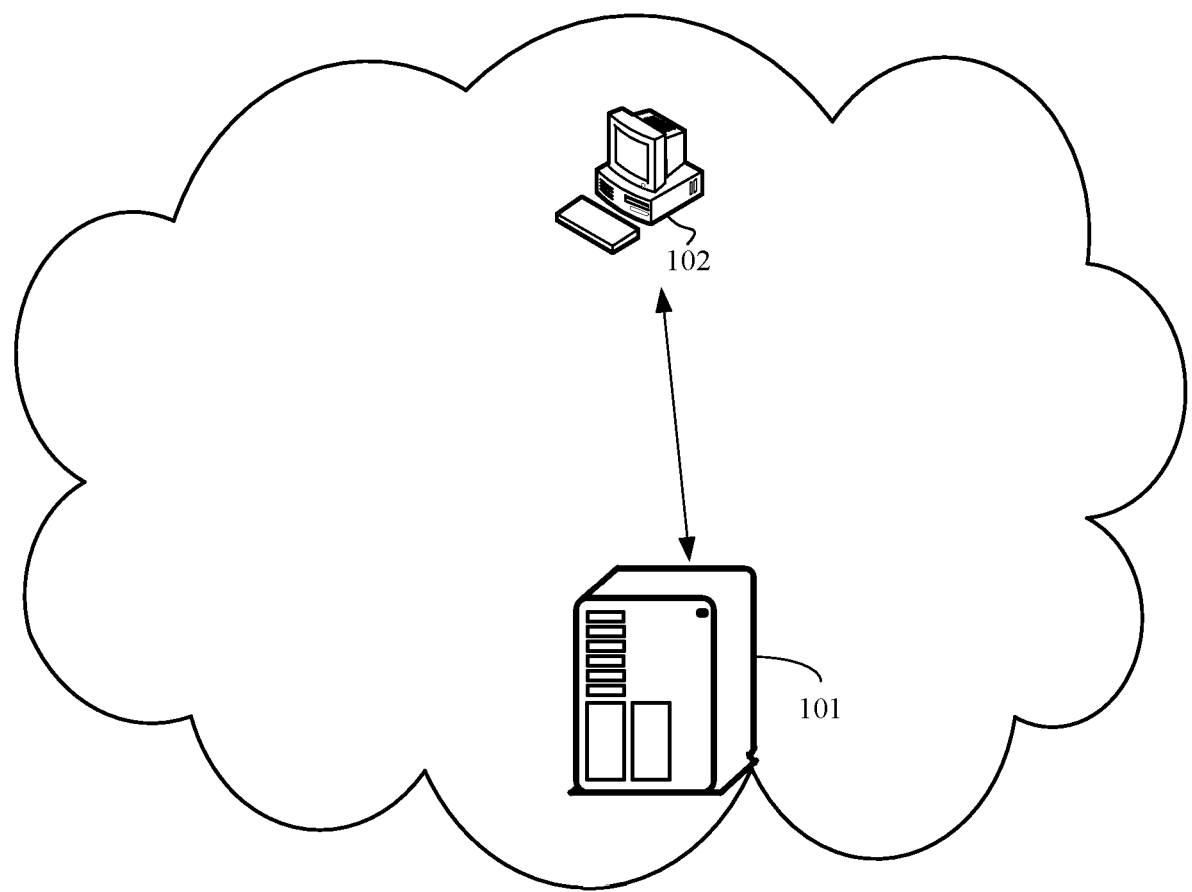
FIG. 1 is a schematic diagram of an application scenario according to an embodiment of this disclosure.

FIG. 1 is a schematic diagram of an application scenario according to an embodiment of this disclosure. In this application scenario, a connection between a storage device 101 and a host 102 is established. For example, the storage device 101 may be installed on the host 102. Alternatively, the storage device 101 may be connected to the host 102 through a network, where the network may be the Internet.

When the storage device 101 is installed on the host 102, the storage device 101 interacts with the host 102 based on an NVMe protocol. When the storage device 101 is connected to the host 102 through the network, the storage device 101 interacts with the host 102 based on an NOF protocol, where the NOF protocol is a protocol that is extended based on the NVMe protocol, and includes all instructions defined in the NVMe protocol.

Figure 2:
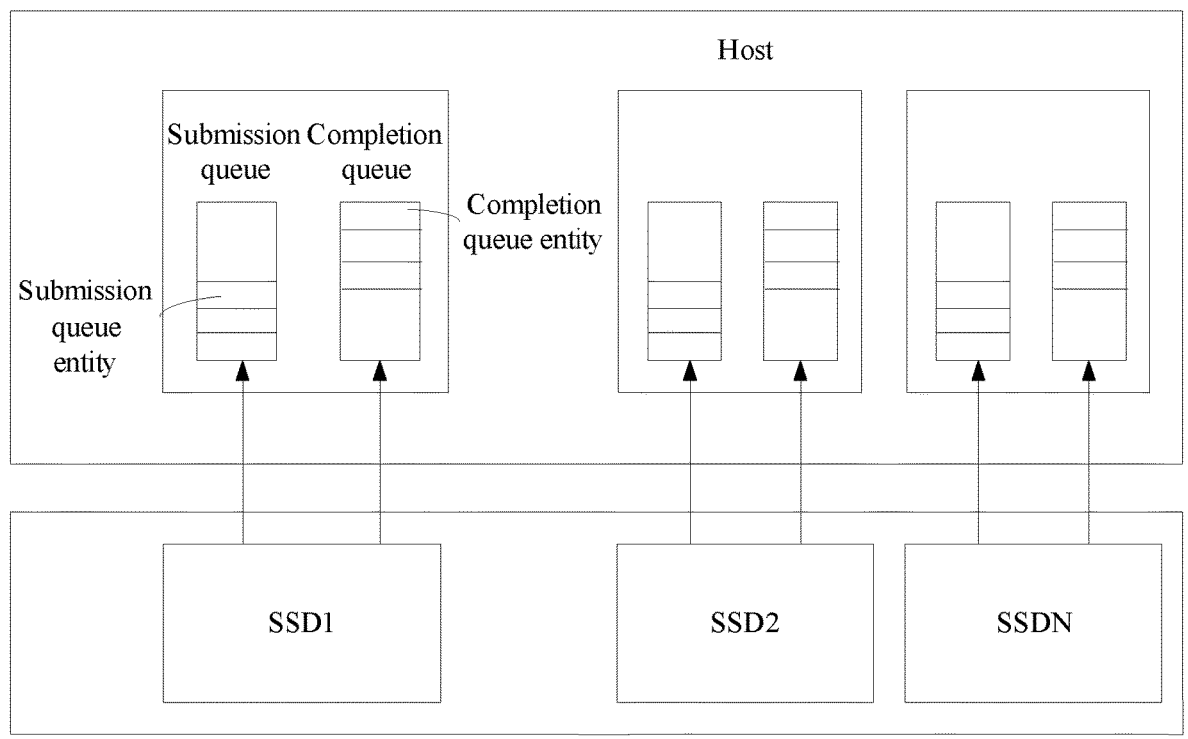
FIG. 2 is a schematic diagram of a queue model according to an NVMe protocol.

In this disclosure, the storage device 101 is configured to provide a data storage service to the host 102. This may be implemented in a form of a JBOF. The host 102 is configured to read data from the storage device 101 or write data into the storage device 101. In the JBOF, each SSD may directly communicate with the host 102 based on the NVMe protocol or the NOF protocol. Each SSD communicates with the host 102 mainly according to a queue mechanism in the NVMe protocol. Referring to FIG. 2, N (N is a positive integer not less than 1) pairs of queues are configured in a memory of the host 102, and each pair of queues corresponds to one SSD. Each pair of queues includes one submission queue (SQ) and one completion queue (CQ), and the SQ and the CQ may be collectively referred to as a communication queue. The SQ in each pair of queues includes at least one submission queue entry (SQE), and one SQE is an instruction to be sent to an SSD by the host. The CQ in each pair of queues includes at least one completion queue entry (CQE), and each CQE is an execution result of an SQE fed back to the host 102 after the SSD executes the SQE. The SQE may be a data instruction or a management instruction. In this embodiment, only a scenario in which the SQE is a management instruction is described.

The storage device 101 may allocate one identifier to each SSD, and report the identifier of each SSD to the host 102. The host 102 generates a corresponding queue for each SSD based on the identifier of each SSD, so that a controller of each SSD exchanges information with the host 102 by using the queue of the SSD.

In other approaches, an NVMe protocol provides a subscription instruction for subscribing to an interrupt event that occurs in an SSD. The host 102 may first generate a subscription instruction for an interrupt event according to a queue mechanism of the NVMe, and add the subscription instruction to the SQ as an SQE.

A CQE may be generated when the SSD detects that the subscribed interrupt event occurs. The CQE includes at least one of a log-type identifier (LID) of an event log, an event-type identifier such as an asynchronous event type (AET) identifier of a subscription event, and an event information identifier such as an asynchronous event information (AEI) identifier of the subscription event. An LID field is used to record a type of the event log, an AET field is used to record a type of the interrupt event, and an AEI field is used to record information about the interrupt event. A processor of the SSD may add an LID corresponding to the event log to the LID field of the CQE, add an AET corresponding to the interrupt event to the AET field of the CQE, and add AEI corresponding to the interrupt event to the AEI field of the CQE. For example, the CQE may be shown in Table 1.

TABLE 1

| Bit | Description |
|---|---|
| 31:24 | Reserved |
| 23:16 | LID |
| 15:08 | AEI |
| 07:03 | Reserved |
| 02:00 | AET |

However, the interrupt event in other approaches includes only error information, SMART/health status, and I/O related information. The error information is information that a common error occurs in the SSD, the SMART/health status means that a SMART event or a health event occurs in the SSD, and the I/O related information means that an event of input or output occurs in the SSD. All the events may be subscribed by the host from the processor of the SSD, and these events are detected by using the processor of the SSD, and then results of these events are fed back to the processor. However, as described in the background, the host is unable to detect a plugging event or an unplugging event of the SSD by using the processor of the SSD, and therefore the host is unable to learn of a swapping event of the SSD. In addition, for components other than the SSD that are not provided with controllers, for example, a fan and a temperature sensor, the host is also unable to learn of statuses of these components by using a subscription instruction, and therefore the host is unable to perceive a fan fault event and a temperature abnormity event that occurs in the storage device.

Therefore, in this embodiment, several events are further defined based on the existing NVME protocol. All the newly defined events may be subscribed by the host and become subscription events. These events may include a swapping event, a fan fault event, a power-on event, and a temperature abnormity event. The swapping event is an event in which plugging or unplugging occurs in a component such as an SSD in a storage device when the storage device is powered on. The fan fault event is an event in which a fan of a storage device is faulty, for example, an event in which a rotation speed of a fan is excessively high or an event in which a rotation speed of a fan is excessively low. The power-on event is an event in which any component in a storage device is powered on or off. The temperature abnormity event is an event in which temperature of a storage device is excessively high or excessively low.

The host may send a subscription instruction to a processor of the storage device in a manner the same as that in other approaches, and the processor of the storage device detects an interrupt event according to the subscription instruction. Detection on an event by the processor is described in detail in the following.

Figure 3:
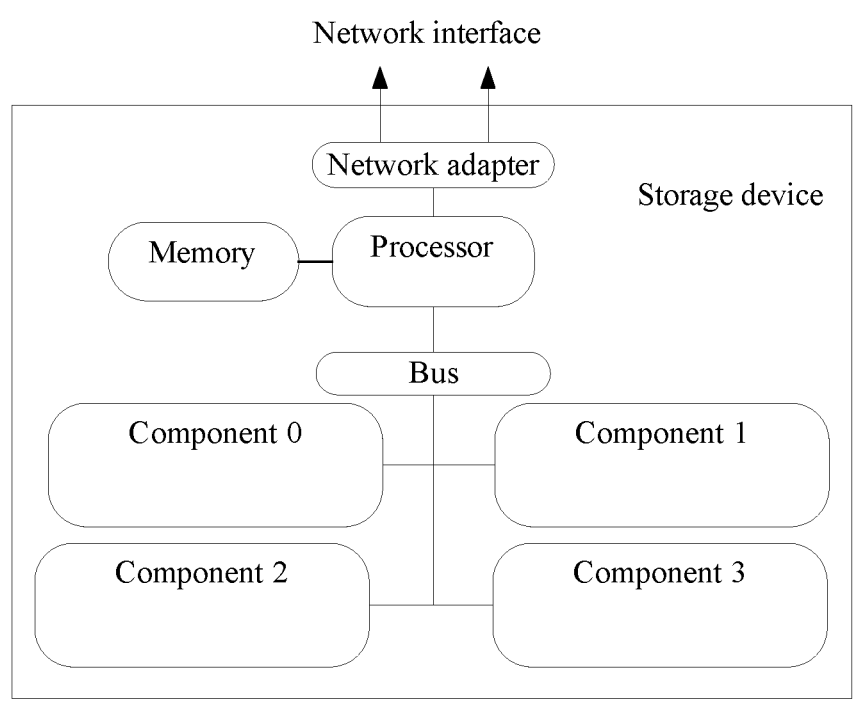
FIG. 3 is a schematic structural diagram of a storage device according to an embodiment of this disclosure.

FIG. 3 is a schematic structural diagram of the storage device according to an embodiment of this disclosure. Referring to FIG. 3, the storage device includes a processor, a memory, at least one component, a bus, and a network adapter.

The processor may call program code stored in the memory to implement a function provided by the storage device. In this embodiment, the processor may run the program code in the memory to implement a component management method in the following embodiment, thereby managing components in the storage device.

The processor may be a field-programmable gate array (FPGA) or an application-specific integrated circuit (ASIC).

The at least one component is installed in the storage device, is electrically connected to the processor, and may communicate with the processor by using an electrical signal. Each component may be plugged in a slot in the storage device. The component may be an SSD, a fan, a temperature sensor, or the like.

The network adapter is configured to establish a network connection between the processor and a host. For example, the network adapter of the storage device and a network adapter of the host may perform mutual access in a remote direct memory access (RDMA) manner.

In an example embodiment, a computer readable storage medium is further provided, for example, a memory including an instruction. The instruction may be executed by a processor of a storage device to perform the component management method of a storage device in the following embodiment. For example, the computer readable storage medium may be a read-only memory (ROM), a random-access memory (RAM), a compact disc ROM (CD-ROM), a magnetic tape, a floppy disk, and an optical data storage device.

This disclosure provides a component management method of a storage device. This disclosure is applicable to a scenario in which a storage device communicates with a host in a network. The storage device may interact with the host in the network based on an NOF protocol or another protocol that is developed based on an NVMe protocol. The storage device may detect, according to a subscription instruction from the host, whether an event subscribed in the subscription instruction occurs in a component, manage an event log generated when the subscribed event occurs, notify the host in the network of the subscribed event that occurs, and transmit the event log to the host, so that the host in the network learns of, in a timely manner, the event that occurs in the component in the storage device and the event log.

Figure 4:
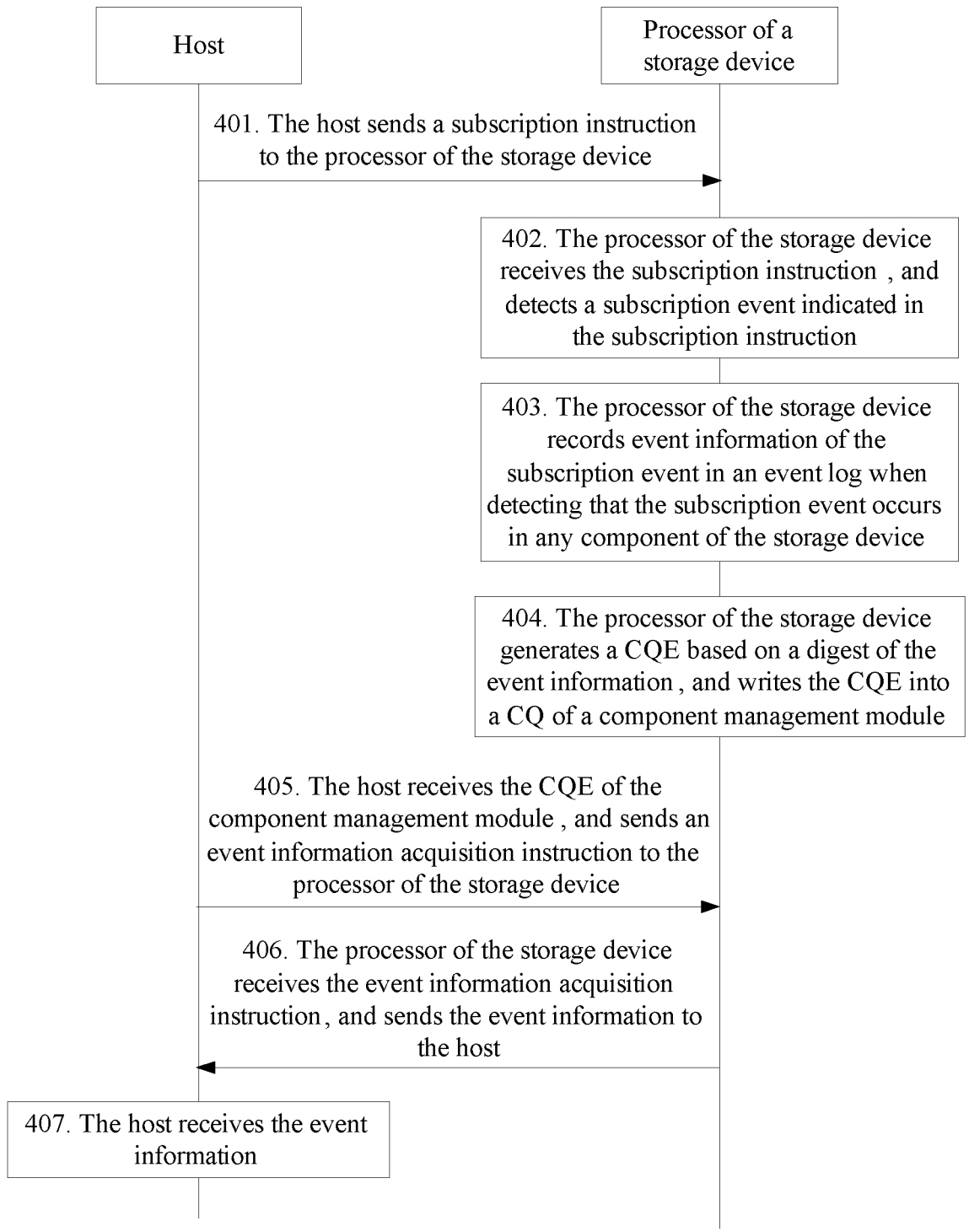
FIG. 4 is a flowchart of a component management method of a storage device according to an embodiment of this disclosure.

FIG. 4 is a flowchart of a component management method of a storage device according to an embodiment of this disclosure. As shown in FIG. 4, the method may be applied to the foregoing implementation environment, and interaction entities include a host and a processor of a storage device. The method includes the following steps.

401. The host sends a subscription instruction to the processor of the storage device.

In other approaches, as shown in FIG. 2, each SSD has a pair of queues in the host. When sending a subscription instruction to one of the SSDs, the host may use the subscription instruction as an SQE and store the subscription instruction in an SQ corresponding to the SSD, and then send the subscription instruction to the storage device. The subscription instruction includes an IP address of the storage device and an identifier of the SSD. After receiving the subscription instruction, the processor of the storage device may send the subscription instruction to a target SSD based on the identifier of the SSD, so that the target SSD performs, according to the subscription instruction, a function indicated by the subscription instruction, for example, provides a notification to the host when input or output occurs. The subscription instruction is an asynchronous event instruction defined in an NVMe protocol.

In this embodiment, a component management module is disposed in the storage device. The storage device uses the component management module as a virtual SSD, and allocates an identifier to the component management module, so that when establishing a connection to the storage device, the host establishes a pair of queues for the component management module. In this embodiment, when needing to manage a component in the storage device by using the component management module, the host adds the identifier of the component management module to the subscription instruction. The subscription instruction further includes a subscribed event.

402. The processor of the storage device receives the subscription instruction, and detects a subscription event indicated in the subscription instruction.

After receiving the subscription instruction, the storage device acquires the identifier of the component management module from the subscription instruction, and then runs the component management module based on the identifier of the component management module. In this case, the processor of the storage device may detect the subscription event in the subscription instruction by running the component management module.

403. The processor of the storage device records event information of the subscription event in an event log when detecting that the subscription event occurs in any component of the storage device.

During running of the component management module by the storage device, the processor of the storage device may detect the subscription event that occurs in any component. For example, for an SSD in the storage device, when the SSD is plugged or unplugged, the processor of the storage device may detect a swapping event of the SSD. The storage device is provided with a plurality of slots. When the SSD is plugged into a slot, a level signal of the slot changes, for example, changes from a high level to a low level, and when detecting that the level signal changes, the storage device detects a plugging event of the SSD. When the SSD is unplugged from a slot, a level signal of the slot changes, for example, changes from a low level to a high level, and when detecting that the level signal changes, the storage device detects an unplugging event of the SSD.

In addition, when a rotation speed of a fan is excessively high or excessively low, the processor of the storage device may detect a fan fault event of the fan. When the any component is powered on or off, the processor may detect a power-on event of the component. When temperature of a temperature sensor is excessively high or excessively low, the processor of the storage device may detect a temperature abnormity event of the temperature sensor. The processor may detect, by detecting whether a level signal changes, an event corresponding to each of the fan fault event, the power-on event, and the temperature abnormity event.

Optionally, to record the event information, when detecting the subscription event, the processor of the storage device may acquire the event information, and generate the event log based on the event information, so as to record the event information in the event log. The event information includes an event status of the subscription event, and may further include an identifier of the component, a timestamp of the subscription event, an index number of the component, and the like.

In the following, various types of event information and a process of generating the event log are described.

(1) Event Status of the Subscription Event

When the subscription event is a swapping event, the event status includes a plugged state and/or an unplugged state. When any component is plugged into the storage device, the processor of the storage device may detect a swapping event, learn that an event status of the swapping event is a plugged state, and add the plugged state to the event log. When any component is unplugged from the storage device, the processor of the storage device may detect a swapping event, learn that an event status of the swapping event is an unplugged state, and add the unplugged state to the event log. Optionally, the plugged state may be indicated by a first value, and the unplugged state may be indicated by a second value. Adding the plugged state to the event log may actually be adding the first value to the event log, and adding the unplugged state to the event log may actually be adding the second value to the event log. The first value is different from the second value. The first value may be 1, and the second value may be 0. Different event statuses may be distinguished by using different values.

When the subscription event is a fan fault event, the event status is a rotation speed, that is, a rotation speed of a faulty fan. When a fan is faulty, the processor of the storage device may detect a fan fault event, learn of a rotation speed of the faulty fan, and add the rotation speed to the event log.

When the subscription event is a power-on event, the event status is a power-on time point and/or a power-off time point. When a component is powered on, the processor of the storage device may detect a power-on event, record a current time point as a power-on time point, and add the power-on time point to the event log. When a component is powered off, the processor may detect a power-off event, and may record a current time point as a power-off time point, and add the power-off time point to the event log.

When the subscription event is a temperature abnormity event, the event status is temperature. When temperature of a temperature sensor is abnormal, the processor may detect a temperature abnormity event, acquire current temperature of the temperature sensor, and add the temperature to the event log.

It should be noted that an event status field may be configured in the event log, and the event status field is used to record the event status of the subscription event. For the foregoing various types of event statuses, adding an event status to the event log may be adding the event status to the event status field of the event log. The event status field may occupy two bytes in the event log, and the event status field may be stored at locations corresponding to an 8th byte and a 9th byte.

(2) Identifier of the Component

The identifier of the component is used to uniquely identify the corresponding component. The processor of the storage device may acquire an identifier of the component in which the subscription event occurs, and add the identifier of the component to the event log to record the identifier of the component by using the event log.

The identifier of the component may include any combination of a vendor identifier such as a Peripheral Component Interconnect Express (PCIe) vendor identifier (VendorID), a PCIe vendor device identifier (DeviceID), a serial number, and a model number. The identifier of the component in this format may be compatible with some old devices that support a lower protocol version. The vendor identifier may be two bytes, the vendor device identifier may be two bytes, the serial number may be 20 bytes, and the model identifier may be 40 bytes. Alternatively, the identifier of the component may be a subsystem NVMe qualified name (SUB-NQN), and the SUBNQN may be up to 223 bytes.

In a specific process of acquiring the identifier of the component, when the processor of the storage device detects the subscription event that occurs in any component, the component is a current interrupt source, and the processor of the storage device may acquire bus positioning information (bus identifier (BusID), DeviceID, function identifier (FunctionID), and bus device function (BDF)) of the interrupt source by detecting the interrupt source. Based on the BDF, the identifier of the component is acquired by using the following two designs.

In a first possible design, the processor of the storage device acquires an identifier of a component currently connected to a slot that is corresponding to a BDF and that is in the storage device. At least one slot may be disposed in each bus of at least one bus of the storage device, and one component may be connected to each slot. The processor of the storage device may allocate one BDF to each slot, establish a correspondence between a slot and a BDF, determine a slot corresponding to a BDF after acquiring the BDF of the component, and acquire an identifier of a component currently connected to the slot.

In a second possible design, when a swapping event is indexed by using a BDF, the processor of the storage device queries a BDF list, and acquires, from the BDF list, an identifier of a component corresponding to the BDF. The processor of the storage device may pre-establish the BDF list, and the BDF list is used to store a correspondence between a BDF and an identifier of a component. In addition, the BDF list may further store an index number of a component. Optionally, in a process of establishing the BDF list, the processor of the storage device may acquire at least one BDF in an initialization process, and acquire an identifier of a component currently connected to a slot that is corresponding to each BDF of the at least one BDF and that is in the storage device. A correspondence between the at least one BDF and an identifier of at least one component is stored in the BDF list, so that an identifier of a component may be acquired from the BDF list when the subscription event occurs subsequently.

A first point that needs to be noted is that when detecting that any component is plugged, the processor of the storage device may acquire an identifier of the component by using the first possible design, and may further update the BDF list. An identifier of the component in the original BDF list is updated to the currently acquired identifier of the component, so that the identifier of the component may be queried directly from the BDF list subsequently, and when detecting that any component is unplugged, the processor of the storage device may acquire an identifier of the component by using the second possible design.

A second point that needs to be noted is that a component identifier field may be configured in the event log, and the component identifier field is used to record an identifier of a component. Adding an identifier of a component to the event log may be adding the identifier of the component to the component identifier field of the event log. The component identifier field may occupy 256 bytes in the event log, and the component identifier field may be stored at locations corresponding to a 5th byte to a 271th byte.

(3) Timestamp of the Subscription Event

The timestamp is used to record a time point at which the subscription event occurs. The processor of the storage device may acquire the timestamp of the subscription event, and add the timestamp to the event log to record the timestamp by using the event log.

The processor of the storage device may start a timer in a running process. When detecting the subscription event that occurs in any component, the processor of the storage device may acquire a time currently recorded by the timer, and use the time as the timestamp of the subscription event. An occasion for starting the timer may be a time point at which power-on reset is performed on the storage device, and precision of the timestamp may be microsecond.

Optionally, a timestamp field may be configured in the event log, and the timestamp field is used to record the timestamp of the subscription event. Adding a timestamp to the event log may be adding the timestamp to the timestamp field of the event log. The timestamp field may occupy eight bytes in the event log, and the timestamp field may be stored at locations corresponding to a 0th byte to a 7th byte.

(4) Index Number of the Component

The index number is existing data in the NVMe protocol, and is used to indicate an order of a corresponding component in all components of the storage device. The processor of the storage device may allocate one index number to each component in the storage device in the initialization process, so as to distinguish different components by using the index numbers. A value range of the index numbers may be determined based on a quantity of components in the storage device. A minimum value of the index numbers may be 0, and a maximum value of the index numbers may be a value obtained by subtracting 1 from a total quantity of components.

Optionally, a component index number field may be configured in the event log, and the component index number field is used to record the index number of the component. Adding an index number to the event log may be adding the index number to the component index number field of the event log, and the component index number field may occupy two bytes in the event log.

In summary, the various types of event information and the process of generating the event log are described above. An example in which the subscription event is a swapping event is used. An event log corresponding to a swapping event may be shown in Table 2.

TABLE 2

| Bytes | Description |
| --- | --- |
| 07:00 | Timestamp |
| 9:8 | Event: 1 indicates plugging, 0 indicates unplugging, and other values are invalid values |
| 11:10 | Index (index number of the component) |
| ... | Reserved bit |
| 271:16 | NVMe Unified Name (identifier of the component) |

A first point that needs to be noted is that, to collect statistics about subscription events that have occurred, the processor of the storage device may further configure a change count field in storage space. The change count field is used to count a total quantity of subscription events that have occurred in the storage device, so that frequency of subscription events detected by the storage device may be calculated based on the total quantity when needed. Each time the processor of the storage device detects a subscription event and generates an event log, a value carried in the change count field is increased by 1.

A second point that needs to be noted is that the processor of the storage device may store different event logs in a categorized storage manner based on types of the event logs, that is, pre-allocate storage space to each type of event log of a subscription event. Different types of event logs of subscription events are stored in different storage space, so that any type of event log may be quickly found subsequently. For example, the processor of the storage device may allocate same storage space to swapping events, and store all event logs of the swapping events in the storage space.

A third point that needs to be noted is that after generating any event log, the processor of the storage device may acquire a storage location of the event log through calculation, and store an event log in the storage location. A manner of acquiring the storage location of the event log through calculation includes acquiring a total quantity N of generated event logs and a unit log length M; and acquiring the storage location of the event log through calculation based on N and M, where N and M are positive integers greater than 1. Further, when a change count field is configured in storage space, considering a length of the change count field, a specific process of acquiring the storage location through calculation may be: obtaining a length W of the change count field, and performing calculation by using N, M, and W according to the following formulas: $d1=N*M+W+1$ and $d2=(N+1)*M+W$, to obtain a start storage location and an end storage location of the event log, where d1 represents the start storage location, d2 represents the end storage location, and W is a positive integer greater than 1.

For example, the length of the change count field is 8, and a length of each event log is 272. Distribution of event logs of swapping events in the storage space may be shown in Table 3.

TABLE 3

| Bytes | Description |
| --- | --- |
| 07:00 | Change Count (change count field) |
| 279:08 | Hot Swap Entry 0 (an event log of a first swapping event) |
| 551:280 | Hot Swap Entry 1 (an event log of a swapping second event) |
| . . . | |
| ((N + 1)*272 + 7): (N*272 + 8) | Hot Swap Entry N (an event log of an (N + 1)$^{th}$ swapping event) |

A fourth point that needs to be noted is that the processor of the storage device may initialize the storage space in advance to store the event log of the subscription event. A process of initializing the storage space may be obtaining a total quantity of slots of the storage device and the unit log length M, allocating storage space of a specified size based on the total quantity of slots and M, and filling the storage space with preset data. The processor of the storage device may calculate a product of the total quantity of slots and M, and use the product as a size of to-be-allocated storage space. The preset data may be 0 or another value.

A fifth point that needs to be noted is that the processor of the storage device may register various types of subscription events in advance, so that when a subscription event is detected, the subscription event may be learned of in a timely manner. The processor of the storage device may acquire at least one BDF in the storage device, and register at least one type of subscription event for each BDF, for example, a swapping event or a power-on event.

404. The processor of the storage device generates a CQE based on a digest of the event information, and writes the CQE into a CQ of a component management module.

The CQE is essentially a response of the subscription instruction. Because the CQE generally includes a relatively small quantity of bytes, and is unable to record complete event information (the event log), the processor may acquire the digest of the event information according to an event occurrence notification (for details, refer to step 1 in the following), and add the digest of the event information to the CQE (for details, refer to step 2 in the following). A quantity of bytes of the digest of the event information is relatively small, and therefore while ensuring that the CQE carries the digest of the event information, a requirement that the CQE is used to notify the host that the subscription event has occurred may be met.

Step 1: Obtain a digest of event information according to an event occurrence notification.

The digest of the event information includes at least one of a LID of an event log, an AET of a subscription event, and an AEI.

Step 2: Generate a CQE including the digest of the event information.

The CQE may include at least one of an LID field, an AET field, and an AEI field. The LID field is used to record a type of the event log, the AET field is used to record a type of the subscription event, and the AEI field is used to record information about the subscription event. The processor of the storage device may add an LID corresponding to the event log to the LID field of the CQE, add an AET corresponding to the subscription event to the AET field of the CQE, and add AEI corresponding to the subscription event to the AEI field of the CQE. For example, the CQE may be shown in Table 4.

TABLE 4

| Bit | Description |
| --- | --- |
| 31:24 | Reserved |
| 23:16 | LID |
| 15:08 | AEI |
| 07:03 | Reserved |
| 02:00 | AET |

Step 3: Write the CQE into a CQ of a component management module.

The processor of the storage device may write the CQE into the CQ corresponding to the component management module in the host, for example, write the CQE into the CQ of the host in an RDMA manner. The CQ is a communication queue, and is used to store a result of executing at least one instruction of the host by the processor.

A first point that needs to be noted is that for the LID, log types indicated by LIDs of various values may be agreed upon, and the processor of the storage device may determine an LID corresponding to a log type of a subscription event. For example, LIDs corresponding to log types are shown in Table 5, where an LID corresponding to a value of 09 h indicates an event log of a swapping event. In addition, although not shown in Table 5, a specific value of an LID indicating an event log of a fan fault event, a specific value of an LID indicating an event log of a power-on event, and a specific value of an LID indicating an event log of a temperature abnormity event may be further agreed upon.

TABLE 5

| LID | Description |
| --- | --- |
| 00 h | Reserved |
| 01 h | Error Information |
| 02 h | SMART/Health Information |
| 03 h | Firmware Slot Information |

TABLE 5-continued

| LID | Description |
| --- | --- |
| 04 h | Changed Namespace List |
| 05 h | Command Effects Log |
| 06 h | Device Self-test |
| 07 h | Telemetry Host-Initiated |
| 08 h | Telemetry Controller-Initiated |
| 09 h | NVM Subsystem Hot Swap Information (event log of a swapping event) |
| 09 h to 6F h | Reserved |
| 70 h | Discovery (refer to the NVMe over Fabrics specification) |
| 71 h to 7F h | Reserved for NVMe over Fabrics |
| 80 h to BF h | I/O Command Set Specific |
| C0 h to FF h | Vendor specific |

A second point that needs to be noted is that for the AET, event types indicated by AETs of various values may be agreed upon, and the processor of the storage device may determine an AET corresponding to an event type of a subscription event. For example, AETs corresponding to log types are shown in Table 6.

TABLE 6

| Value | Definition |
| --- | --- |
| 0 h | Error status |
| 1 h | SMART/Health status |
| 2 h | Notice |
| 3 h to 5 h | Reserved |
| 6 h | I/O Command Set specific status |
| 7 h | Vendor specific |

Optically, the following may be agreed upon: When the subscription event is a swapping event, the event type is a prompt event type; when the subscription event is a fan fault event, the event type is a health event type; or when the subscription event is a power-on event, the event type is a health event type; or when the subscription event is a temperature abnormity event, the event type is a health event type.

A third point that needs to be noted is that for the AEI, event information indicated by AEI of various values may be agreed upon, and the processor of the storage device may determine AEI corresponding to a type of event information. For example, AEI corresponding to various types of event information is shown in Table 7, where AEI corresponding to a value of 03 h indicates that a swapping event has occurred. In addition, although not shown in Table 7, a specific value indicating AEI of a fan fault event, a specific value indicating AEI of a power-on event, and a specific value indicating AEI of a temperature abnormity event may be further agreed.

TABLE 7

| Value | Definition |
| --- | --- |
| 0 h | Namespace Attribute Changed |
| 1 h | Firmware Activation Starting: |
| 2 h | Telemetry Log Changed |
| 3 h | NVM Subsystem Changed |
| 4 h to FF h | Reserved |

405: The host receives the CQE of the component management module, and sends an event information acquisition instruction to the processor of the storage device.

This step corresponds to step 404. The host may read the CQE from the CQ of the component management module, parse the CQE, and acquire the digest of the event information, to learn that the subscription event has occurred; and may further send the event information acquisition instruction to the processor of the storage device. The event information acquisition instruction is used to instruct the processor of the storage device to acquire the event information, for example, instruct the processor of the storage device to acquire an event log that records the event information, to obtain the event information. The host may write the event information acquisition instruction into an SQ of the component management module, to send the event information acquisition instruction to the processor of the storage device.

Content of the event information acquisition instruction is described in detail in the following by using (1) to (3).

(1) The event information acquisition instruction may indicate a storage location of the event information in the host.

The event information acquisition instruction may carry a data pointer (DPTR), and the DPTR points to a storage location in the host, so that the processor of the storage device stores the event information in the storage location in the host, thereby ensuring that the storage location of the event information meets a requirement of the host. The event information acquisition instruction may carry a DPTR field, and the host may add a DPTR to the DPTR field. The DPTR field specified by the NVMe protocol may be shown in Table 8.

TABLE 8

| Bit | Description |
| --- | --- |
| 127:00 | DPTR: This field specifies the start of the data buffer. |

(2) The event information acquisition instruction may indicate a storage location of the event information in the storage device.

The host may learn of a log length and an offset of the event information through pre-agreement in a protocol or interaction with the storage device, and add the log length and the offset of the event information to the event information acquisition instruction, so that the processor of the storage device acquires the storage location through calculation by using the log length and the offset, and reads the event information from the storage location. The event information acquisition instruction may include a log length field and an offset field. The host may add the log length to the log length field of the event information acquisition instruction, and add the offset to the offset field of the event information acquisition instruction.

For example, the following may be agreed upon: A DW10 instruction word of the event information acquisition instruction may carry a lower 32-bit log length field (refer to Table 9); a DW11 instruction word of the event information acquisition instruction may carry an upper 32-bit log length field (refer to Table 10); a DW12 instruction word of the event information acquisition instruction may carry a lower 32-bit offset field (refer to Table 11); and a DW13 instruction word of the event information acquisition instruction may carry an upper 32-bit offset field (refer to Table 12).

TABLE 9

| Bit | Description |
| --- | --- |
| 31:28 | Reserved |
| 27:16 | Lower 32-bit log length field (number of dwords lower (NUMDL)): |

TABLE 9-continued

| Bit | Description |
| --- | --- |
| 15 | Event set (reset asynchronous event (RAE)) field |
| 16:12 | Reserved |
| 11:08 | Individual instruction specific information (log-specific field (LSP)) |
| 07:00 | LID |

TABLE 10

| Bit | Description |
| --- | --- |
| 31:16 | Reserved |
| 15:00 | Upper 32-bit log length field (number of dwords upper (NUMDU)): |

TABLE 11

| Bit | Description |
| --- | --- |
| 31:00 | Lower 32-bit offset field (log page offset lower (LPOL)) |

TABLE 12

| Bit | Description |
| --- | --- |
| 31:00 | Upper 32-bit offset field (log page offset upper (LPOU)) |

(3) The event information acquisition instruction may instruct to set an event occurrence identifier of the subscription event.

In this embodiment, the event occurrence identifier may be configured in the storage device. In step 404, the processor of the storage device may set the event occurrence identifier when determining that the subscription event has occurred in the storage device, and when the event occurrence identifier is set, repeatedly notifies the host that the subscription event has occurred in the storage device. To notify the processor of the storage device that the host has learned of the subscription event, to prevent the processor of the storage device from repeatedly reporting that the subscription event has occurred in the storage device, the host may add a reset identifier to an RAE field in the event information acquisition instruction, where the reset identifier is used to instruct the processor of the storage device to reset the event occurrence identifier. The reset identifier may be 0, and the RAE field may be carried in the DW10 instruction word of the event information acquisition instruction. For details, refer to Table 9.

406. The processor of the storage device receives the event information acquisition instruction, and sends the event information to the host.

The processor of the storage device may read the event information acquisition instruction from the SQ of the component management module of the host, to receive the event information acquisition instruction. After receiving the event information acquisition instruction, the processor of the storage device may parse the event information acquisition instruction to obtain the storage location of the event information in the storage device and the storage location in which the event information is to be stored in the host, read the event information from the storage location in the storage device, and write the event information into the storage location in the host, that is, send the event information to the host, namely, send the event log to the host.

In a specific process of determining the storage location of the event information in the storage device, after parsing the event information acquisition instruction, the processor of the storage device may acquire the offset and a unit log length that are carried in the event information acquisition instruction, acquire, based on the offset and the unit log length, a start storage location and an end storage location of the event information in the storage device through calculation, and read data from the start storage location to the end storage location, to obtain the event information. The processor of the storage device may acquire the start storage location and the end storage location through calculation according to the following formulas: $d1=Z$ and $d2+Z+M-1$, where Z represents the offset and M represents the unit log length.

For a specific process of determining the storage location of the event information in the host, after parsing the event information acquisition instruction, the processor of the storage device may acquire the DPTR carried in the event information acquisition instruction, and use the location pointed to by the DPTR as the storage location in the host.

In a specific process of sending the event information, the processor of the storage device may write the event information into the storage location in the host in an RDMA manner.

It should be noted that, when parsing the event information acquisition instruction, the processor of the storage device may acquire the RAE field in the event information acquisition instruction, and determine whether the RAE field carries the reset identifier. When the RAE field carries the reset identifier, the processor of the storage device sets the event occurrence identifier, that is, clears the event occurrence identifier. When the RAE field does not carry the reset identifier, the processor of the storage device does not need to set the event occurrence identifier.

Figure 5:
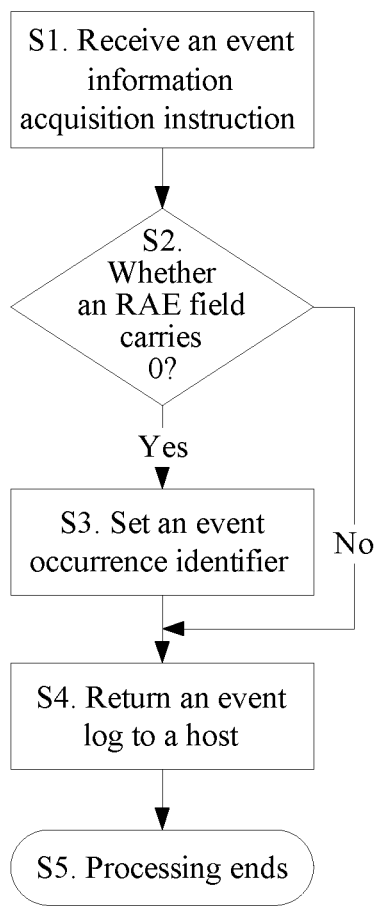
FIG. 5 is a processing flowchart of sending event information by a processor of a storage device according to an embodiment of this disclosure.

For example, the reset identifier is 0. FIG. 5 is a processing flowchart of sending event information by a processor of a storage device, and this process may include the following steps.

S1. Receive an event information acquisition instruction.

S2. Determine whether an RAE field in the event information acquisition instruction carries 0; and if the RAE field carries 0, perform step S3; or if the RAE field does not carry 0, perform step S4.

S3. Set an event occurrence identifier.

S4. Return event information to a host.

S5. Processing ends.

407. The host receives the event information.

The host may read the event information from a storage location at the host to obtain the event information, to perform corresponding processing based on the event information. For example, when an SSD is unplugged and the processor of the storage device detects a swapping event, the host may acquire an identifier of a component of the SSD by using event information of the swapping event, and determine that a write/read operation cannot be performed on the SSD subsequently, to avoid a problem such as a process crash caused when a write/read operation is attempted to be performed on the unplugged SSD again. The host may alternatively perform an unmount operation on the SSD to cancel a mounting relationship with the SSD, or notify an upper layer network device of the host that the SSD has been unplugged.

It should be noted that, this embodiment only provides an example in which after receiving the subscription instruction, the storage device starts to detect the subscription event, records the event information, and notifies the host of the subscription event and the event information. In implementation, the storage device may alternatively periodically detect any event that occurs in the component included in the storage device and record event information, and after receiving the subscription instruction, may acquire, from the recorded event information, an event corresponding to the subscription instruction, and notify the host of the event and the event information. A process of detecting the any event that occurs in the component is similar to step 402. The step of notifying the host of the event is similar to step 404. A manner of notifying the host of the event information is similar to step 406. Details are not described herein again.

According to the method provided in this embodiment, the storage device may detect, according to the subscription instruction from the host, whether an event subscribed in the subscription instruction occurs in a component, notify the host in a network of the subscribed event that occurs, and transmit event information to the host, so that the host in the network learns of, in a timely manner, the event that occurs in the component in the storage device and the event information. Further, according to the method provided in this embodiment, it can be ensured that the host detects, in a timely manner, plugging and unplugging of an SSD and subscription events of components that are not provided with processors, for example, a fan and a temperature sensor.

Figure 6:
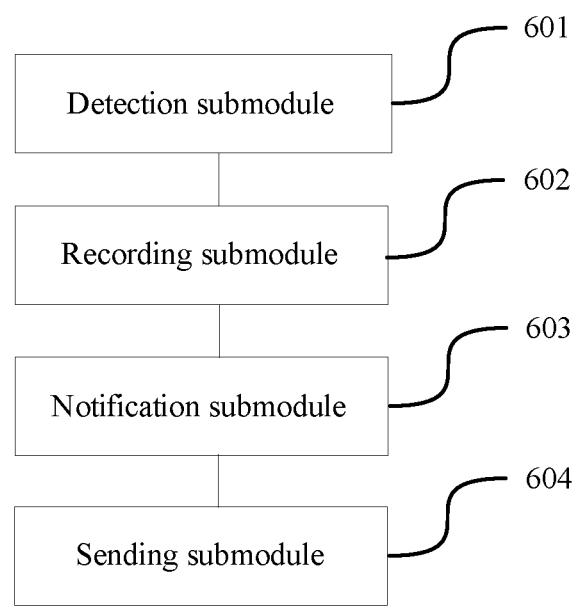
FIG. 6 is a schematic structural diagram of a component management module of a storage device according to an embodiment of this disclosure.

FIG. 6 is a schematic structural diagram of a component management module of a storage device according to an embodiment of this disclosure. The component management module is applied to a storage device. The storage device includes the component management module and at least one component, and the storage device is connected to a host through a network. The component management module includes a detection submodule 601, a recording submodule 602, a notification submodule 603, and a sending submodule 604.

The detection submodule 601 is configured to detect a subscription event indicated in a subscription instruction from the host.

The recording submodule 602 is configured to record event information of the detected subscription event.

The notification submodule 603 is configured to provide a notification to the host.

The sending submodule 604 is configured to send the event information to the host.

In a possible design, the storage device further includes a connection module, where the connection module is configured to generate an identifier for the component management module. The host generates a communication queue for the component management module based on the identifier. The storage device communicates with the host through the communication queue by running the component management module.

In a possible design, the component is an SSD in the storage device, and the subscription event is a swapping event of the SSD.

In a possible design, the component management module is further configured to: detect the swapping event of the SSD when it is detected that a level signal of a slot of the SSD changes; and use at least one of an event status of the swapping event, an identifier of the component, a timestamp of the swapping event, and an index number of the SSD as the event information, and record the event information in an event log.

In a possible design, the detection submodule 601 is further configured to periodically detect any event that occurs in the component included in the storage device; the recording submodule 602 is further configured to record event information; and the notification submodule 603 is further configured to: when the subscription instruction sent by the host is received, acquire, from the recorded event information, an event corresponding to the subscription instruction, and notify the host of the event.

All of the foregoing optional technical solutions may form optional embodiments of this disclosure in any combination form, and details are not described herein again.

It should be noted that, when the component management module of the storage device provided in the foregoing embodiment manages a component of the storage device, only the foregoing functional module division is used as an example for description. In actual application, the foregoing functions may be allocated to different functional modules according to a requirement, that is, an internal structure of the component management module is divided into different functional modules to implement all or some of the foregoing described functions. In addition, the component management module provided in the foregoing embodiment and the component management method embodiment of a storage device belong to a same idea. For details about a specific implementation process of the component management module, refer to the method embodiment. Details are not described herein again.

A person of ordinary skill in the art may understand that all or some of the steps of the embodiments may be implemented by hardware or a program instructing related hardware. The program may be stored in a computer readable storage medium. The mentioned storage medium may be a read-only memory, a magnetic disk, an optical disc, or the like.

The foregoing descriptions are only optional embodiments of this disclosure, but are not intended to limit this disclosure. Any modification, equivalent replacement, or improvement made without departing from the spirit and principle of this disclosure should fall within the protection scope of this disclosure.

What is claimed is:

1. A component management method implemented by a storage device, the component management method comprising:
   receiving, from a host, a subscription instruction indicating a subscription event and a first identifier of a component manager in the storage device;
   running the component manager based on the first identifier;
   detecting, while running the component manager, that the subscription event has occurred in a component of the storage device;
   recording event information of the subscription event;
   using at least one of an event status of a swapping event of the component or a timestamp of the swapping event as the event information;
   notifying the host that the subscription event has been detected;
   receiving, from the host, an event information acquisition instruction; and
   sending, to the host according to the event information acquisition instruction, the event information.

2. The component management method of claim 1, further comprising communicating with the host using a Non-Volatile Memory Express (NVMe) protocol or a protocol that is based on the NVMe protocol and that comprises an instruction of the NVMe protocol.

3. The component management method of claim 2, further comprising sending, to the host, the first identifier to enable the host to generate a communication queue for the component manager based on the first identifier.

4. The component management method of claim 3, further comprising communicating with the host through the communication queue by running the component manager.

5. The component management method of claim 1, wherein the component is a solid-state drive (SSD), and wherein the subscription event is the swapping event.

6. The component management method of claim 5, further comprising detecting the swapping event when a level signal of a slot of the SSD changes.

7. The component management method of claim 6, further comprising recording the event information in an event log.

8. A storage device comprising:
   a component;
   a component manager associated with a first identifier; and
   a processor coupled to the component and configured to:
      receive, from a host, a subscription instruction indicating a subscription event and the first identifier;
      run the component manager based on the first identifier;
      detect, while running the component manager, that the subscription event has occurred in the component;
      record event information of the subscription event;
      use at least one of an event status of a swapping event of the component or a timestamp of We swapping event as the event information;
      notify the host that the subscription event has been detected;
      receive, from the host, an event information acquisition instruction; and
      send, to the host according to the event information acquisition instruction, the event information.

9. The storage device of claim 8, wherein the processor is further configured to communicate with the host using a Non-Volatile Memory Express (NVMe) protocol or a protocol that is based on the NVMe protocol and that comprises an instruction of the NVMe protocol.

10. The storage device of claim 9, wherein the storage device is a just a bunch of flash (JBOF) device.

11. The storage device of claim 10, wherein the processor is further configured to send, to the host, the first identifier to enable the host to generate a communication queue for the component manager based on the first identifier.

12. The storage device of claim 11, wherein the processor is further configured to communicate with the host through the communication queue by running the component manager.

13. The storage device of claim 8, wherein the component is a solid-state drive (SSD), and wherein the subscription event is the swapping event.

14. The storage device of claim 13, wherein the processor is further configured to detect the swapping event when a level signal of a slot of the SSD changes.

15. The storage device of claim 14, wherein the processor is further configured to record the event information in an event log.

16. A computer program product comprising instructions that are stored on a non-transitory medium and that, when executed by a processor, cause a storage device to:
   receive, from a host, a subscription instruction indicating a subscription event and a first identifier of a component manager in the storage device;
   run the component manager based on the first identifier;
   detect, while running the component manager, that the subscription event has occurred in a component of the storage device;
   record event information of the subscription event;
   use at least one of an event status of a swapping event of the component or a timestamp of the swapping event as the event information;
   notify the host that the subscription event has been detected;
   receive, from the host, an event information acquisition instruction; and
   send, to the host according to the event information acquisition instruction, the event information.

17. The computer program product of claim 16, wherein when executed by the processor, the instructions further cause the storage device to communicate with the host using a Non-Volatile Memory Express (NVMe) protocol or a protocol that is based on the NVMe protocol and that comprises an instruction of the NVMe protocol.

18. The computer program product of claim 17, wherein when executed by the processor, the instructions further cause the storage device to send, to the host, the first identifier to enable the host to generate a communication queue for the component manager based on the first identifier.

19. The computer program product of claim 18, wherein when executed by the processor, the instructions further cause the storage device to communicate with the host through the communication queue by running the component manager.

20. The computer program product of claim 16, wherein the component is a solid-state drive (SSD), and wherein the subscription event is the swapping event.

21. The computer program product of claim 20, wherein when executed by the processor, the instructions further cause the storage device to detect the swapping event when a level signal of a slot of the SSD changes.

22. The computer program product of claim 21, wherein when executed by the processor, the instructions further cause the storage device to record the event information in an event log.

* * * * *

UNITED STATES PATENT AND TRADEMARK OFFICE
CERTIFICATE OF CORRECTION

PATENT NO. : 11,422,699 B2
APPLICATION NO. : 16/884611
DATED : August 23, 2022
INVENTOR(S) : Chunyi Tan and Buchan Li It is certified that error appears in the above-identified patent and that said Letters Patent is hereby corrected as shown below:

On the Title Page

Item (54) and In the Specification, Column 1, Lines 1-3, Title: "Storage device and Component Management Method of Storage Device" should read "Detections and Notification of Storage Device Subscription Events"

In the Claims

Claim 8, Column 19, Line 29: "timestamp of We swapping" should read "timestamp of the swapping"

Signed and Sealed this
Twenty-fifth Day of October, 2022

Katherine Kelly Vidal
*Director of the United States Patent and Trademark Office*